(12) United States Patent
Choi et al.

(10) Patent No.: US 9,722,224 B2
(45) Date of Patent: Aug. 1, 2017

(54) COATED SEPARATOR AND ELECTROCHEMICAL DEVICE INCLUDING THE SAME

(71) Applicant: SAMSUNG SDI CO., LTD., Yongin-si, Gyeonggi-do (KR)

(72) Inventors: Yeon-Joo Choi, Yongin-si (KR);
Jong-Hwan Park, Yongin-si (KR);
Jung-Hyun Nam, Yongin-si (KR);
Hoon Seok, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 216 days.

(21) Appl. No.: 14/303,833

(22) Filed: Jun. 13, 2014

(65) Prior Publication Data
US 2015/0111087 A1    Apr. 23, 2015

(30) Foreign Application Priority Data
Oct. 18, 2013  (KR) .......................... 10-2013-0124920

(51) Int. Cl.
*H01M 2/16*    (2006.01)
*H01M 2/14*    (2006.01)

(52) U.S. Cl.
CPC .............. *H01M 2/16* (2013.01); *H01M 2/14* (2013.01); *H01M 2/1686* (2013.01)

(58) Field of Classification Search
CPC ......... H01M 2/14; H01M 2/16; H01M 2/1686
USPC ................................................ 429/144, 145
See application file for complete search history.

(56) References Cited

U.S. PATENT DOCUMENTS

| | | | |
|---|---|---|---|
| 6,053,953 A | 4/2000 | Tomiyama et al. | |
| 8,279,580 B2 | 10/2012 | Zhong et al. | |
| 2010/0033898 A1* | 2/2010 | Zhong ................... | C04B 35/532 361/502 |
| 2010/0104941 A1 | 4/2010 | Nakabayashi | |
| 2011/0064988 A1 | 3/2011 | Yu | |
| 2013/0236764 A1 | 9/2013 | Hu et al. | |
| 2013/0260207 A1 | 10/2013 | Uemura | |
| 2014/0045033 A1* | 2/2014 | Zhang ................ | H01M 2/1686 429/145 |

FOREIGN PATENT DOCUMENTS

| | | | | |
|---|---|---|---|---|
| JP | 2006-073221 | * | 3/2006 | ............. H01M 2/16 |
| KR | 10-2000-0042976 A | | 7/2000 | |
| KR | 10-2011-0016416 A | | 2/2011 | |
| KR | 10-1032815 B1 | | 5/2011 | |
| KR | 10-1130052 B1 | | 3/2012 | |
| KR | 10-2012-0133409 A | | 12/2012 | |

OTHER PUBLICATIONS

Sano et al. JP 2006-073221. Mar. 16, 2006. English machine translation.*
Search Report mailed Feb. 16, 2015 in corresponding European Patent Application No. 14162766.1.

* cited by examiner

*Primary Examiner* — James Lee
(74) *Attorney, Agent, or Firm* — Lee & Morse, P.C.

(57) ABSTRACT

A separator for a battery and an electronic device, the separator including a separator substrate; and a separator coating layer coated on at least one surface of the separator substrate, the separator coating layer including a binder and at least one quaternary ammonium salt.

20 Claims, 3 Drawing Sheets

COATED SEPARATOR AND ELECTROCHEMICAL DEVICE INCLUDING THE SAME

CROSS-REFERENCE TO RELATED APPLICATION

Korean Patent Application No. 10-2013-0124920, filed on Oct. 18, 2013, in the Korean Intellectual Property Office, and entitled: "Coated Separator and Electrochemical Device Including The Same," is incorporated by reference herein in its entirety.

BACKGROUND

1. Field

Embodiments relate to a coated separator and an electrochemical device including the same.

2. Description of the Related Art

A battery generally includes a positive electrode, a negative electrode, and a separator. The separator may help prevent contact, i.e., internal short circuit, between the positive electrode and the negative electrode, and may be used as a path for moving electrolyte ions.

Various types of materials, e.g., polyethylene, may be used for a separator. A separator for a lithium battery may include a porous sheet or film formed of polyolefin-based material alone, or of polyolefin-based material and ultrahigh molecular weight polyethylene.

SUMMARY

Embodiments are directed to a coated separator and an electrochemical device including the same.

The embodiments may be realized by providing a separator for a battery, the separator including a separator substrate; and a separator coating layer coated on at least one surface of the separator substrate, the separator coating layer including a binder and at least one quaternary ammonium salt.

The at least one quaternary ammonium salt may be represented by Formula 1, below:

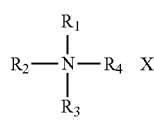

[Formula 1]

wherein, in Formula 1, $R_1$, $R_2$, $R_3$, and $R_4$ may be each independently a $C_1$-$C_5$ alkyl group, and X may be a fluorine-containing negative ion.

X may be $PF_6^-$, $BF_4^-$, $AsF_6^-$, $SbF_6^-$, $N(SO_2CF_3)_2^-$, $N(SO_2F)_2^-$, $N(SO_2CF_3)(COCF_3)^-$, $N(SO_2CF_3)(SO_2C_2F_5)^-$, $SO_3CF_3^-$, $SO_3C_2F_5^-$, $SO_3C_3F_7^-$, or $SO_3C_4F_9^-$.

The portion of Formula 1 that includes N and $R_1$, $R_2$, $R_3$, and $R_4$ may be a positive ion, the positive ion being one of tetramethylammonium, tetraethylammonium, tetrapropylammonium, tetrabutylammonium, tetrapentylammonium, trimethylethylammonium, trimethylbutylammonium, trimethylpropylammonium, triethylmethylammonium, triethylpropylammonium, triethylbutylammonium, tripropylmethylammonium, tripropylethylammonium, tripropylbutylammonium, tributylmethylammonium, tributylethylammonium, tributylpropylammonium, dimethyldiethylammonium, dimethyldipropylammonium, dimethyldibutylammonium, diethyldipropylammonium, diethyldibutylammonium, dipropyldibutylammonium, dimethylethylpropylammonium, dimethylethylbutylammonium, dimethylpropylbutylammonium, diethylmethylpropylammonium, diethylmethylbutylammonium, diethylpropylbutylammonium, dipropylmethylethylammonium, dipropylmethylbutylammonium, dipropylethylbutylammonium, or methylethylpropylbutylammonium.

The binder may include polyvinylidene fluoride.

The binder may include the polyvinylidene fluoride in an amount of about 50 wt % or greater, based on a total weight of the binder.

The binder may further include polyvinylidene chloride, polybenzimidazole, polyimide, polyvinyl acetate, polyacrylonitrile, polyvinyl alcohol, carboxymethylcellulose (CMC), starch, hydroxypropyl cellulose, regenerated cellulose, polyvinylpyrrolidone, tetrafluoroethylene, polyethylene, polypropylene, polystyrene, polymethylmethacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethylenesulfone, polyamide, polyacetal, polyphenylene oxide, polybutylene terephthalate, ethylene-propylene-diene terpolymer (EPDM), sulfonated EPDM, styrene butadiene rubber, fluoride rubber, or a copolymer thereof.

The at least one quaternary ammonium salt may be included in the coating layer in an amount of about 0.5 wt % to about 50 wt %, based on a total weight of the binder and the at least one quaternary ammonium salt.

The separator substrate may be a porous film, a nonwoven fabric, or a woven fabric.

The separator substrate may have a thickness of about 1 μm to about 300 μm.

The separator substrate may have a pore diameter of about 0.01 μm to about 50 μm, and a porosity of about 10% to about 95%.

The separator substrate may be a single layer porous substrate formed of at least one of polyethylene, polypropylene, polybutylene, polypentene, polytetrafluoroethylene (PTFE), polyester, polyacetal, polyamide, polycarbonate, polyimide, polyetheretherketone, polyethersulfone, polyphenylene oxide, polyphenylene sulfide, polyethylene naphthalene, or glass fiber.

The separator substrate may be a multi-layer film of olefin-based polymers.

Each layer of the multi-layer film may independently include polyethylene, polypropylene, or polyvinylidene fluoride.

The separator may have a quantity of electrostatic charge of about 0.6 kV or less.

The separator coating layer may have a thickness of about 1 μm to about 100 μm.

The quaternary ammonium salt may be tetraethylammonium hexafluorophosphate.

The embodiments may be realized by providing an electrochemical device including the coated separator according to an embodiment.

The electrochemical device may be a lithium battery.

The lithium battery may be a lithium secondary battery.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
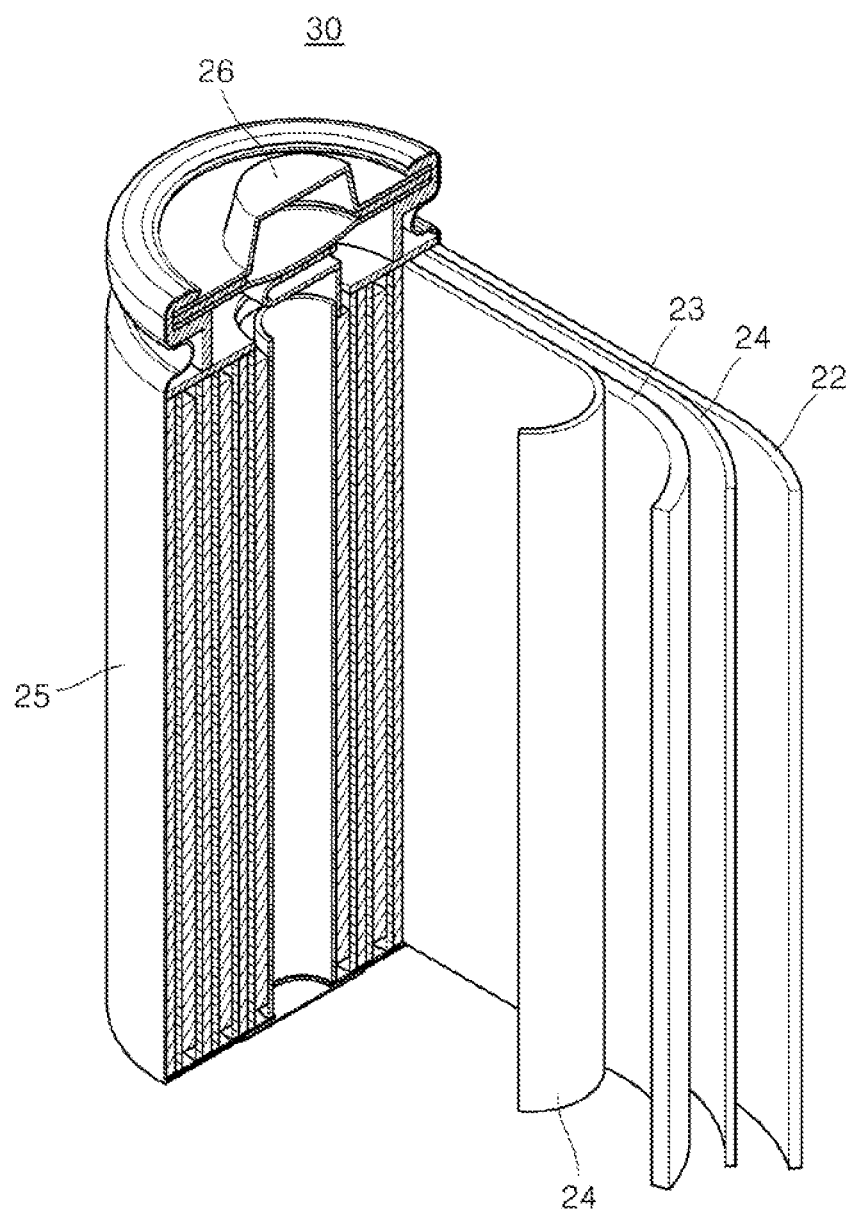
FIG. 1 illustrates a schematic view of a lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Expressions such as "at least one of," when preceding a list of elements, modify the entire list of elements and do not modify the individual elements of the list.

A separator for a battery, e.g., a coated separator, according to an embodiment may include a separator substrate and a separator coating layer on at least one surface of the separator substrate. The separator coating layer may include a binder, e.g., polyvinylidene fluoride, and at least one quaternary ammonium salt, e.g., a fluorinated quaternary ammonium salt.

In the coated separator, the separator substrate may be a suitable separator substrate for an electrochemical device. For example, a separator substrate that has a low resistance to migration of ions of an electrolyte and an excellent electrolytic solution-retaining capability may be appropriate. For example, the separator substrate may be a porous substrate formed of at least one polymer selected from the group of polyethylene, polypropylene, polybutylene, polypentene, polytetrafluoroethylene (PTFE), polyester, polyacetal, polyamide, polycarbonate, polyimide, polyetheretherketone, polyethersulfone, polyphenylene oxide, polyphenylene sulfide, polyethylene naphthalene, and glass fiber.

The separator substrate may be, e.g., a porous film, a non-woven fabric, or a woven fabric. A thickness of the separator substrate may be, e.g., about 1 μm to about 300 μm, about 3 μm to about 100 μm, or about 5 μm to about 20 μm. The separator substrate may have, e.g., a pore diameter of about 0.01 μm to about 50 μm, and a porosity of about 10% to about 95%.

The separator substrate may be, e.g., a single layer porous substrate formed of polyethylene.

The separator substrate may be a multi-layer film of olefin-based polymers, e.g., the separator substrate may be a multi-layer film of two or more of polyethylene, polypropylene, and polyvinylidene fluoride, or a mixed multi-layer film, such as a double-layer separator of polyethylene/polypropylene, a triple-layer separator of polyethylene/polypropylene/polyethylene, or a triple-layer separator of polypropylene/polyethylene/polypropylene.

The separator coating layer may be on at least one surface of the separator substrate. In an implementation, the separator coating layer may include, e.g., polyvinylidene fluoride and a fluorinated quaternary ammonium salt.

The binder, e.g., the polyvinylidene fluoride, included in the separator coating layer may help increase binding strength between the coated separator and an electrode. Polyvinylidene fluoride may have high ion conductivity due to its affinity to a liquid electrolyte, compared to a polymer material used in the separator substrate.

The separator coating layer may include about 50 wt % of polyvinylidene fluoride, based on a total weight of the binder or polymer material in the separator coating layer. For example, the separator coating layer may include about 60 wt %, 70 wt %, 80 wt %, or 90 wt % of polyvinylidene fluoride, or may include 100 wt % of polyvinylidene fluoride.

The separator coating layer may further include another suitable binder or binder resin resin that does not hinder properties of polyvinylidene fluoride, in addition to polyvinylidene fluoride. For example, the separator coating layer may further include, in addition to polyvinylidene fluoride, at least one binder resin selected from polyvinylidene chloride, polybenzimidazole, polyimide, polyvinyl acetate, polyacrylonitrile, polyvinyl alcohol, carboxymethylcellulose (CMC), starch, hydroxypropyl cellulose, regenerated cellulose, polyvinylpyrrolidone, tetrafluoroethylene, polyethylene, polypropylene, polystyrene, polymethylmethacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethylenesulfone, polyamide, polyacetal, polyphenylene oxide, polybutylene terephthalate, ethylene-propylene-diene terpolymer (EPDM), sulfonated EPDM, styrene butadiene rubber, fluoride rubber, and a copolymer thereof.

The additional binder may be included in an amount of about 50 wt % or less, based on total weight of the binder or polymer materials in the separator coating layer, so as not to inhibit the properties of polyvinylidene fluoride.

The quaternary ammonium salt, e.g., the fluorinated quaternary ammonium salt, in the separator coating layer may act as an ion conductive and electroconductive material to provide an anti-static function to the separator coating layer. Accordingly, the quaternary ammonium salt, e.g., the fluorinated quaternary ammonium salt, may help disperse static electricity in the coated separator including polyvinylidene fluoride to help inhibit the generation of static electricity.

According to an embodiment, the quaternary ammonium salt may be represented by Formula 1, below.

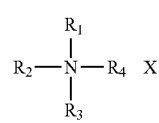

[Formula 1]

In Formula 1 above, $R_1$, $R_2$, $R_3$, and $R_4$ may each independently be a $C_1$-$C_5$ alkyl group, and X may be a fluorine-containing negative ion.

Examples of a positive ion of the quaternary ammonium salt, e.g., the portion of Formula 1 that includes N and $R_1$, $R_2$, $R_3$, and $R_4$, may include tetramethylammonium, tetraethylammonium, tetrapropylammonium, tetrabutylammonium, tetrapentylammonium, trimethylethylammonium, trimethylbutylammonium, trimethylpropylammonium, triethylmethylammonium, trimethylpropylammonium, triethylbutylammonium, tripropylmethylammonium, tripropylethylammonium, tripropylbutylammonium, tributylmethylammonium, tributylethylammonium, tributylpropylammonium, dimethyldiethylammonium, dimethyldipropylammonium, dimethyldibutylammonium, diethyldipropylammonium, diethyldibutylammonium, dipropyldibutylammonium, dimethylethylpropylammonium, dimethylethylbutylammonium, dimethylpropylbutylammonium, diethylmethylpropylammonium, diethylmethylbutylammonium, diethylpropylbutylammonium, dipropylmethylethylammonium, dipropylmethylbutylammonium, dipropylethylbutylammonium, or methylethylpropylbutylammonium.

For example, the positive ion of the quaternary ammonium salt may include tetramethylammonium, tetraethylammonium, tetrapropylammonium, tetrabutylammonium, or tetrapentylammonium.

Examples of the fluorine-containing negative ion, e.g., X, of the fluorinated quaternary ammonium salt may include $PF_6^-$, $BF_4^-$, $AsF_6^-$, $SbF_6^-$, $N(SO_2CF_3)_2^-$, $N(SO_2F)_2^-$, $N(SO_2CF_3)(COCF_3)^-$, $N(SO_2CF_3)(SO_2C_2F_5)^-$, $SO_3CF_3^-$, $SO_3C_2F_5^-$, $SO_3C_3F_7^-$, and $SO_3C_4F_9^-$.

The at least one quaternary ammonium salt may be included in the coating layer in an amount of, e.g., about 0.5 wt % to about 50 wt %, based on a total weight of the binder and the at least one quaternary ammonium salt. For example, the quaternary ammonium salt may be included in an amount of about 0.5 wt % to about 40 wt %, about 1 wt % to about 30 wt %, or about 3 wt % to about 10 wt %, based on the total weight of the binder and the at least one quaternary ammonium salt. Including the at least one quaternary ammonium salt in an amount in the range above, static electricity generated from the use of the binder, e.g., the polyvinylidene fluoride, may be effectively dispersed.

As a result, the coated separator may include a separator coating layer (including a binder, e.g., polyvinylidene fluoride, and at least one quaternary ammonium salt, e.g., fluorinated quaternary ammonium salt to disperse static electricity in the coated separator), thereby reducing a quantity of electrostatic charge to, e.g., about 0.6 kV or less. For example, the coated separator may reduce the quantity of electrostatic charge to about 0.5 kV or less, about 0.3 kV or less, about 0.1 kV or less, about 0.05 kV or less, about 0.02 kV or less, or about 0.01 kV or less.

A thickness of the separator coating layer may be about 1 μm to about 100 μm. For example, the thickness of the separator coating layer may be about 1 μm to about 50 μm, or may be about 3 μm to about 10 μm. The separator coating layer may help reduce and/or effectively prevent the generation of static electricity, and may bind the separator coating layer to an electrode to an appropriate level when the thickness is in the range described above.

A suitable method may be used to coat the separator coating layer on a surface of the separator substrate. For example, flow coating, spin coating, dip coating, or bar coating may be used to form the separator coating layer. For example, when dip coating is used, the separator substrate may be immersed into a mixture solution in which the binder (e.g., the polyvinylidene fluoride) and quaternary ammonium salt (e.g., fluorinated quaternary ammonium salt) are dispersed, to form the separator coating layer.

A suitable solvent may be used to prepare a mixture solution for forming the separator coating layer, e.g., a solvent that uniformly disperses the quaternary ammonium salt and stably dissolves or disperses the binder may be used. For example, N-methylpyrrolidone (NMP), dimethylformamide, dimethylacetamide, N-dimethyl formaldehyde, acetone, or water may be used. Other additives may be added to stabilize the mixture solution for forming the separator coating layer. An amount of the solvent may be selected in view of adjusting a concentration of the mixture solution for forming the separator to make it suitable for a coating process.

The coated separator manufactured as above may disperse static electricity of the coated separator (e.g., including polyvinylidene fluoride) to resolve issues of static electricity generation, and the coated separator may help increase binding strength between the coated separator and an electrode, and may help reduce and/or prevent a decrease in capacity retention rate that may otherwise occur as a charge and discharge cycle progresses.

An electrochemical device according to another embodiment may include a positive electrode; a negative electrode; and the coated separator between the positive electrode and the negative electrode.

The electrochemical device may be manufactured according to a suitable method. For example, the positive electrode and the negative electrode may be assembled opposite to each other with the coated separator therebetween. An electrolyte may be injected between the positive electrode and the negative electrode to manufacture the electrochemical device.

The electrochemical device including the coated separator may include a suitable device that undergoes an electrochemical reaction, e.g., primary batteries, secondary batteries, fuel cells, solar cells, or capacitors such as a super capacitor. For example, the electrochemical device may be applied to the secondary batteries such as a lithium metal secondary battery, a lithium ion secondary battery, a lithium polymer secondary battery, or a lithium ion polymer secondary battery.

According to an embodiment, the electrochemical device may be a lithium battery. FIG. 1 illustrates a schematic view of a structure of a lithium battery according to an embodiment.

Referring to FIG. 1, the lithium battery 30 may include a positive electrode 23, a negative electrode 22, and a coated separator 24 between the positive and negative electrodes 23 and 22. The positive electrode 23, the negative electrode 22, and the coated separator 24 may be wound or folded to be housed in a battery case 25. Then, an electrolyte may be injected into the battery case 25, followed by sealing the battery case 25 with an encapsulation member 26, thereby completing the manufacture of the lithium battery 30. The battery case 25 may be of a cylindrical, rectangular, or thin film type. The lithium battery 30 may be a lithium ion battery.

The positive electrode 23 may include a positive electrode current collector, and a positive active material layer on the positive electrode current collector.

The positive electrode current collector may have a thickness of about 3 μm to about 500 μm. A suitable positive electrode current collector that has conductivity and does not induce chemical changes to the battery may be used. Examples of the positive electrode current collector may include copper, stainless steel, aluminum, nickel, titanium, calcined carbon, copper or stainless steel surface-treated with carbon, nickel, titanium, silver, or the like, and aluminum-cadmium alloy. In an implementation, binding strength of the positive active material may be increased by forming minute irregularities on a surface of the positive electrode current collector. The positive electrode current collector may be used in various forms such as a film, a sheet, a foil, a net, a porous body, a foaming body, and a non-woven fabric.

The positive active material layer may include the positive active material, a binder, and optionally a conductive agent.

The positive active material may include, e.g., a suitable lithium-containing metal oxide. For example, at least one mixed oxide of lithium and a metal selected from of cobalt, manganese, nickel, and a combination thereof may be used. For example, a compound represented by any one of Formulae $Li_aA_{1-b}B_bD_2$ (wherein, $0.90 \leq a \leq 1$ and $0 \leq b \leq 0.5$); $Li_aE_{1-b}B_bO_{2-c}D_c$ (wherein, $0.90 \leq a \leq 1$, $0 \leq b \leq 0.5$, and $0 \leq c \leq 0.05$); $LiE_{2-b}B_bO_{4-c}D_c$ (wherein, $0 \leq b \leq 0.5$, $0 \leq c \leq 0.05$); $Li_aNi_{1-b-c}Co_bB_cD_\alpha$ (wherein, $0.90 \leq a \leq 1$, $0 \leq b \leq 0.5$ and $0 \leq c \leq 0.05$, $0 < \alpha \leq 2$); $Li_aNi_{1-b-c}Co_bB_cO_{2-\alpha}F_\alpha$ (wherein, $0.90 \leq a \leq 1$, $0 \leq b \leq 0.5$ and $0 \leq c \leq 0.05$, $0 < \alpha < 2$); $Li_aNi_{1-b-c}Co_bB_cO_{2-\alpha}F_2$ (wherein, $0.90 \leq a \leq 1$, $0 \leq b \leq 0.5$ and $0 \leq c \leq 0.05$, $0 < \alpha < 2$); $Li_aNi_{1-b-c}Mn_bB_cD_\alpha$ (wherein, $0.90 \leq a \leq 1$, $0 \leq b \leq 0.5$ and $0 \leq c \leq 0.05$, $0 < \alpha \leq 2$); $Li_aNi_{1-b-c}Mn_bB_cO_{2-\alpha}F_\alpha$ (wherein, $0.90 \leq a \leq 1$, $0 \leq b \leq 0.5$ and $0 \leq c \leq 0.05$, $0 < \alpha < 2$); $Li_aNi_{1-b-c}Mn_bB_cO_{2-\alpha}F_2$ (wherein, $0.90 \leq a \leq 1$, $0 \leq b \leq 0.5$, $0 \leq c \leq 0.05$, and $0 < \alpha < 2$); $Li_aNi_bE_cG_dO_2$ (wherein, $0.90 \leq a \leq 1$, $0 \leq b \leq 0.9$, $0 \leq c \leq 0.5$, and $0.001 \leq d \leq 0.1$.); $Li_aNi_bCo_cMn_dGeO_2$ (wherein, $0.90 \leq a \leq 1$, $0 \leq b \leq 0.9$, $0 \leq c \leq 0.5$, and $0 \leq d \leq 0.5$, $0.001 \leq e \leq 0.1$.); $Li_aNiG_bO_2$ (wherein, $0.90 \leq a \leq 1$ and $0.001 \leq b \leq 0.1$.); $Li_aCoG_bO_2$ (wherein, $0.90 \leq a \leq 1$ and $0.001 \leq b \leq 0.1$.); $Li_aMnG_bO_2$ (wherein, $0.90 \leq a \leq 1$ and $0.001 \leq b \leq 0.1$.); $Li_aMn_2G_bO_4$ (wherein, $0.90 \leq a \leq 1$ and $0.001 \leq b \leq 0.1$.); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$ may be used.

In the Formulae above, A may be nickel (Ni), cobalt (Co), manganese (Mn), or a combination thereof; B may be aluminum (Al), Ni, Co, Mn, chromium (Cr), iron (Fe), magnesium (Mg), strontium (Sr), vanadium (V), a rare earth metal element, or a combination thereof; D may be oxygen (O), fluorine (F), sulfur (S), phosphorus (P), or a combination thereof; E may be Co, Mn, or a combination thereof; F may be F, S, P, or a combination thereof; G may be Al, Cr, Mn, Fe, Mg, lanthanum (La), cerium (Ce), Sr, V, or a combination thereof; Q may be titanium (Ti), molybdenum (Mo), Mn, or a combination thereof; I may be Cr, V, Fe, scandium (Sc), yttrium (Y), or a combination thereof; and J may be V, Cr, Mn, Co, Ni, copper (Cu), or a combination thereof.

For example, the positive electrode material may be $LiCoO_2$, $LiMn_xO_{2x}(x=1, 2)$, $LiNi_{1-x}Mn_xO_{2x}(0<x<1)$, $LiNi_{1-x-y}Co_xMn_yO_2$ ($0 \leq x \leq 0.5$, $0 \leq y \leq 0.5$), $FePO_4$, or the like.

The compound may have a coating layer thereon, or the compound and the compound having a coating layer thereon may be mixed together. The coating layer may include a coating element compound of an oxide of a coating element, a hydroxide of the coating element, an oxyhydroxide of the coating element, an oxycarbonate of the coating element, or a hydroxycarbonate of the coating element. The compound forming the coating layer may be amorphous or crystalline. The coating element included in the coating layer may be Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a combination thereof. A suitable method that does not negatively affect properties of the positive electrode may be used to form the coating layer (for example, spray coating or immersion) by using the element in the compound.

The binder may thoroughly bind positive active material particles together and may thoroughly bind the positive active material to the positive electrode current collector. Examples of the binder may include polyvinyl alcohol, carboxymethyl cellulose, hydroxyl propyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

The conductive agent may help provide conductivity to an electrode, and the conductive agent may include a suitable conductive material that does not induce chemical changes to the battery. Examples of the conductive agent may include natural graphite, synthetic graphite, carbon black, acetylene black, Ketjen black, carbon fiber; metal powder of copper, nickel, aluminum, or silver; and metal fiber. In an implementation, the conductive agent may be a conductive material such as a polyphenylene derivative or the like, that is used alone or as a mixture of two or more thereof.

The negative electrode 22 may include a negative electrode current collector and a negative active material layer on the negative electrode current collector.

The negative electrode current collector may have a thickness of about 3 μm to about 500 μm. A suitable negative electrode current collector that has conductivity and does not induce chemical changes to the battery may be used. Examples of the negative electrode current collector may include copper, stainless steel, aluminum, nickel, titanium, calcined carbon, copper or stainless steel surface-treated with carbon, nickel, titanium, silver, or the like, and aluminum-cadmium alloy. In an implementation, binding strength of the negative active material may be increased by forming minute irregularities on a surface of the negative electrode current collector. The negative electrode current collector may be used in various forms such as a film, a sheet, a foil, a net, a porous body, a foaming body, and a non-woven fabric.

The negative active material layer may include the negative active material, a binder, and optionally a conductive agent.

The negative active material may additionally include another negative active material, in addition to a silicon-based negative active material.

The additional negative active material may be a suitable negative active material. For example, a lithium metal, a metal alloyable with lithium, a transition metal oxide, a metal that may dope and undope lithium, and a material capable of reversible intercalation and deintercalation of lithium ions may be used, and the additional negative active material may be used as a mixture or a bound form of two or more thereof.

As an alloy of the lithium metal, an alloy of lithium and a metal selected from the group of Na, K, rubidium (Rb), cesium (Cs), francium (Fr), beryllium (Be), Mg, Ca, Sr, Si, antimony (Sb), lead (Pb), indium (In), zinc (Zn), barium (Ba), radon (Ra), Ge, Al, and Sn may be used.

Examples of the transition metal oxide may include a tungsten oxide, a molybdenum oxide, a titanium oxide, a lithium titanium oxide, a vanadium oxide, and a lithium vanadium oxide.

The material that may dope and undope lithium may be, e.g., Sn, $SnO_2$, a Sn—Y alloy (wherein, Y is an alkali metal, an alkaline earth metal, a Group 11 element, a Group 12 element, a Group 13 element, a Group 14 element, a Group 15 element, a Group 16 element, a transition metal, a rare earth metal, or a combination thereof, but not Sn). The element Y may be Mg, Ca, Sr, Ba, Ra, Sc, Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, Ru, osmium (Os), hassium (Hs), rhodium (Rh), Ir, Pd, platinum (Pt), Cu, silver (Ag), gold (Au), Zn, cadmium (Cd), B, Al, Ga, Sn, In, Ti, Ge, P, As, Sb, bismuth (Bi), S, selenium (Se), tellurium (Te), polonium (Po), or a combination thereof.

As the material that may reversibly intercalate and deintercalate lithium ions, a suitable carbon-based negative active material for a lithium battery, e.g., crystalline carbon, amorphous carbon, or a combination thereof, may be used. Examples of the crystalline carbon may include natural graphite, synthetic graphite, expandable graphite, graphene, fullerene soot, carbon nanotubes, carbon fibers, and the like. Examples of the amorphous carbon may include soft carbon (low-temperature calcined carbon) or hard carbon, mesophase pitch carbide, calcined coke, and the like. The carbon-based negative active material may have a spherical form, a flat form, a fiber form, a tube form, or a powder form.

The binder may thoroughly bind negative active material particles together and may thoroughly bind the negative active material to the negative electrode current collector. Examples of the binder may include polyvinyl alcohol, carboxymethyl cellulose, hydroxyl propyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

The conductive agent may provide conductivity to an electrode, and the conductive agent may include a suitable conductive material that does not cause chemical changes to the battery. Examples of the conductive agent may include natural graphite, synthetic graphite, carbon black, acetylene black, Ketjen black, a carbonaceous material such as carbon fiber; a metallic material such as metal powder of copper, nickel, aluminum, or silver, and metal fiber; and a conductive polymer such as a polyphenylene derivative, or a mixture thereof.

Each of the positive and negative active materials, the conductive agent, and the binder may be mixed in a solvent to prepare an active material composition, and the active material composition may be coated on a current collector to form the positive and negative electrodes 23 and 22, respectively.

The electrodes may be manufactured by a suitable method. The solvent may include, e.g., N-methyl pyrrolidone (NMP), acetone, water, or the like.

The positive electrode 23 and the negative electrode 22 may be separated by a coated separator 24, and the positive electrode 23, the negative electrode 22 may be assembled opposite to each other with the coated separator 24 therebetween. A non-aqueous electrolyte may be injected between the positive electrode 23 and the negative electrode 22.

A lithium salt-containing non-aqueous electrolyte may include a non-aqueous electrolyte and lithium. A non-aqueous electrolyte solution, a solid electrolyte, or an inorganic solid electrolyte may be used as the non-aqueous electrolyte.

The non-aqueous electrolytic solution may include an aprotic organic solvent, e.g., N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofurane, 2-methyl tetrahydrofurane, dimethylsulfoxide, 1,3-dioxolane, formamide, dimethylformamide, acetonitrile, nitromethane, methyl formic acid, methyl acetic acid, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionic acid, ethyl propionic acid, or the like.

Examples of the organic solid electrolyte may include polyethylene derivatives, polyethylene oxide derivatives, polypropylene oxide derivatives, a phosphate ester polymer, polyagitation lysine, polyester sulfide, polyvinyl alcohol, vinylidene polyfluoride, a polymer having an ionic dissociable group, or the like.

Examples of the inorganic solid electrolyte may include nitrides, halides, and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like.

The lithium salt may be a suitable lithium salt for a lithium battery. As a material that may be dissolved well in the non-aqueous electrolyte, e.g., one or more of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithiumchloroborate, lower aliphatic carbonic acid lithium, 4-phenyl boric acid lithium, lithium imide, or the like, may be used.

The lithium battery may be suitable for, e.g., an electric vehicle that requires high capacity, high power output, and high-temperature driving, in addition to existing mobile phones or portable computers. In an implementation, the lithium battery may be combined with an existing internal-combustion engine, a fuel cell, a super capacitor, or the like for use in a hybrid vehicle, or the like. In an implementation, the lithium battery may be used in any other applications that require high power output, high voltage, and high-temperature driving.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

(1) Manufacturing a Coated Separator

A polyethylene film (CF2035, available from Toray) having a thickness of 20 μm was used as a separator substrate. 8 wt % polyvinylidene fluoride (PVDF) based on a total weight of N-methylpyrrolidone (NMP) and PVDF and 3 wt % of tetraethylammonium hexafluorophosphate ($Et_4NPF_6$) based on a total weight of $Et_4NPF_6$ and PVDF were dispersed in NMP to prepare a coating solution. The coating solution was coated on the polyethylene film by using a doctor blade.

(2) Manufacturing a Lithium Battery

A positive active material powder having a composition of $LiCoO_2$ and a carbon conductive agent (Super-P; available from Timcal Ltd.) were uniformly mixed in a weight ratio of 90:5. A polyvinylidene fluoride (PVDF) binder solution was added thereto to prepare slurry having a weight ratio of the active material: carbon conductive agent: binder of 90:5:5. After coating the active material slurry on aluminum foil having a thickness of 15 μm, the aluminum foil was dried and then pressed to prepare a positive electrode. A mixture density of the positive electrode plate was 5.1 g/cc.

When preparing the cell, lithium metal was used as a counter electrode, the coated separator manufactured as described above was used as a separator and an electrolyte solution was injected between the positive electrode and the counter electrode to prepare a pressed 2032-type coin cell. As the electrolyte, a solution in which $LiPF_6$ was dissolved at a concentration of 1.10 M in a mixture solvent of ethylene carbonate (EC), ethyl methyl carbonate (EMC), and diethyl carbonate (DEC) (a volume ratio of 3:3:4 of EC:EMC:DEC) was used.

EXAMPLE 2

A coated separator and a lithium battery were manufactured in the same manner as manufacturing the coated separator in Example 1, except that $Et_4NPF_6$ was added in an amount of 7 wt % based on a total weight of $Et_4NPF_6$ and PVDF.

EXAMPLE 3

A coated separator and a lithium battery were manufactured in the same manner as manufacturing the coated separator in Example 1, except that $Et_4NPF_6$ was added in an amount of 10 wt % based on a total weight of $Et_4NPF_6$ and PVDF.

EXAMPLE 4

A coated separator and a lithium battery were manufactured in the same manner as manufacturing the coated separator in Example 1, except that $Et_4NPF_6$ was added in an amount of 50 wt % based on a total weight of $Et_4NPF_6$ and PVDF.

EXAMPLE 5

A coated separator and a lithium battery were manufactured in the same manner as manufacturing the coated separator in Example 1, except that $Me_4NPF_6$ was added instead of $Et_4NPF_6$.

COMPARATIVE EXAMPLE 1

A lithium battery was manufactured in the same manner as in Example 1, except that an uncoated polyethylene film (CF2035, available from Toray) having a thickness of 20 μm was used as the separator.

COMPARTIVE EXAMPLE 2

A lithium battery was manufactured in the same manner as in Example 1, except that $Et_4NPF_6$ was not used, and only PVDF was used to coat the polyethylene film.

COMPARATIVE EXAMPLE 3

A lithium battery was manufactured in the same manner as in Example 1, except that $LiN(SO_2CF_3)_2$ was added instead of $Et_4NPF_6$.

EVALUATION EXAMPLE 1

Confirming Anti-static Effects

Quantities of electrostatic charges of the separators used in the lithium batteries prepared in Examples 1-4 and Comparative Examples 1-2 were measured, and the results thereof are shown in Table 1 below. As a device for measuring the quantity electrostatic charge, an electrostatic measuring device available from Ion System (775PVS) was used.

TABLE 1

| | Coating status of separator substrate | Quantity of electrostatic charge (kV) |
|---|---|---|
| Comparative Example 1 | Uncoated | 0.53 |
| Comparative Example 2 | Coating PVDF alone | 3.63 |
| Example 1 | PVDF + $Et_4NPF_6$ 3 wt % | 0.01 |
| Example 2 | PVDF + $Et_4NPF_6$ 7 wt % | 0.00 |
| Example 3 | PVDF + $Et_4NPF_6$ 10 wt % | 0.02 |
| Example 4 | PVDF + $Et_4NPF_6$ 50 wt % | 0.01 |

As shown in Table 1 above, the polyethylene (PE) film coated only with PVDF exhibited severe generation of electrostatic charges, compared to the uncoated PE film. It may be seen that when $Et_4NPF_6$ was added to the PVDF, the quantity of electrostatic charge dropped to 0.02 kV or less. The anti-static effects depending on the amount of $Et_4NPF_6$ added were excellent, even when $Et_4NPF_6$ was added up to 50 wt %, based on a total weight of $Et_4NPF_6$ and PVDF.

EVALUATION EXAMPLE 2

Evaluation of Oxidation Stability

To evaluate whether dissolution and leaching of a mixture coating solution, which includes each additive that has an anti-static function and PVDF, after being coated on the separator substrate affects cell properties, test cells were prepared as described below and then oxidation stability was comparatively evaluated by using Linear sweep voltammetry (LSV).

First, as an electrolyte, a solution in which $LiPF_6$ was dissolved at a concentration of 1.10 M in a mixture solvent of ethylene carbonate (EC), ethyl methyl carbonate (EMC), and diethyl carbonate (DEC) (a volume ratio of 3:3:4 of EC:EMC:DEC) was prepared, and then 10 wt % of each anti-static agent of $Me_4NPF_6$, $Et_4NPF_6$, $Me_4NBF_4$, $LiN(SO_2CF_3)_2$ was added to the electrolyte, based on a total weight of each anti-static agent and the electrolyte.

To manufacture the test cells, a positive active material powder having a composition of $LiCoO_2$ and a carbon conductive agent (Super-P; available from Timcal Ltd.) were uniformly mixed in a weight ratio of 90:5, and a polyvinylidene fluoride (PVDF) binder solution was added thereto to prepare slurry having a weight ratio of the active material: carbon conductive agent: binder of 90:5:5. After coating the active material slurry on an aluminum foil having a thickness of 15 μm, the aluminum foil was dried and then pressed to prepare a positive electrode. A mixture density of the positive electrode plate was 5.1 g/cc.

When preparing the test cell, lithium metal was used as a counter electrode, a PE film having a thickness of 20 μm (CF2035, available from Toray) was used as a separator, and an electrolyte solution was added between the positive electrode and the counter electrode to prepare a pressed 2032-type coin cell.

Linear sweep voltammetry (LSV) evaluation was performed by using a Solatron device, and LSV was measured by scanning at a rate of 1 mV/s in a region in a range of of 3 V to 7 V.

Figure 2:
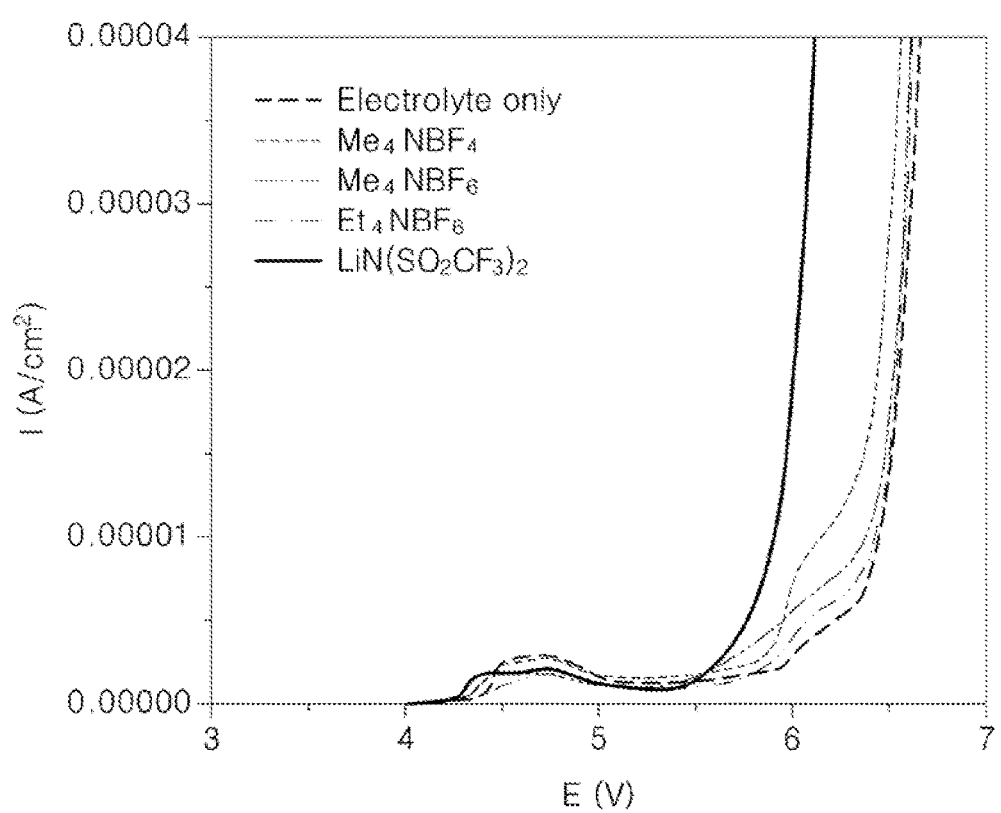
FIG. 2 illustrates a result of oxidation stability according to the use of each additive by using linear sweep voltammetry (LSV)

LSV evaluation results of each test cell are shown in FIG. 2.

Referring to FIG. 2, LiN(SO$_2$CF$_3$)$_2$ has better oxidation stability than Me$_4$NPF$_6$, Et$_4$NPF$_6$, and Me$_4$NBF$_4$. The most stable material against an electrochemical reaction was Et$_4$NPF$_6$. In FIG. 2, Me$_4$NPF$_6$, Et$_4$NPF$_6$, and Me$_4$NBF$_4$ show oxidation stability similar to a case in which only an electrolyte was used, and this suggests that the dissolution and leaching of the electrolyte after being coated on the separator may not greatly affect cell properties.

EVALUATION EXAMPLE 3

Evaluation of Battery Properties

Lifespan properties were evaluated as follows with respect to the batteries manufactured in Example 1, and Comparative Examples 1-3.

A charging and discharging experiment was performed at room temperature of 25° C. An initial formation efficiency was evaluated by charging at 0.1 C/discharging at 0.1 C and lifespan was evaluated by repeating charging at 1 C/discharging at 1 C 200 times. Lifespan property was calculated by a capacity retention ratio defined by Equation 1 below Capacity retention rate [%]=[discharge capacity in each cycle/discharge capacity in a first cycle]×100   <Equation 1>

Figure 3:
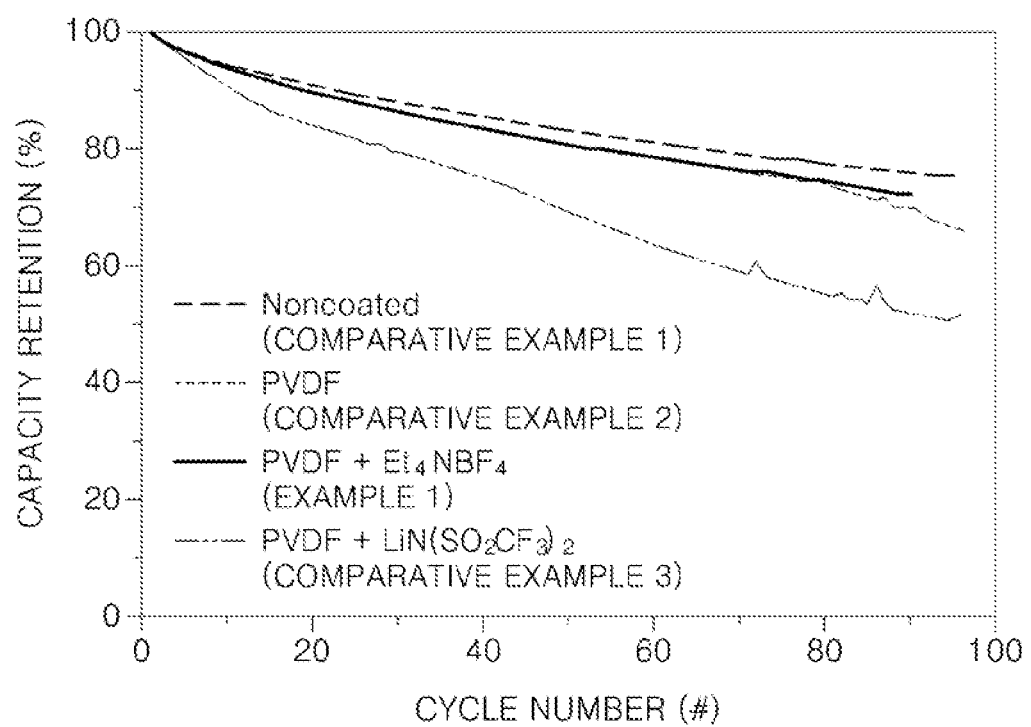
FIG. 3 illustrates measurement results of capacity retention rates of lithium batteries prepared in Example 1 and Comparative Examples 1-3.

Measurement results of capacity retention rates of the lithium batteries manufactured in Example 1, and Comparative Examples 1-3 are shown in FIG. 3.

As may be seen in FIG. 3, when Et$_4$NPF$_6$ was added to PVDF, the capacity retention rate was similar to the capacity retention rate of the uncoated separator or to the capacity retention rate of the separator in which only PVDF was coated. Also, the capacity retention rate was better when Et$_4$NPF$_6$ was added to PVDF than when LiN(SO$_2$CF$_3$)$_2$ was added to PVDF. This illustrates that a quaternary ammonium salt, e.g., fluorinated quaternary ammonium salt, may have better inhibitory effects than another lithium salt against a decrease in capacity retention rate that may otherwise occur as a charge and discharge cycle progresses.

By way of summation and review, a binder material may be coated on the separator to help increase binding strength between the separator and an electrode. However, a separator coated with the binder material may increase internal resistance of a lithium battery, which may deteriorate output characteristics of the lithium battery and may sharply decrease capacity of the lithium battery as a charge and discharge cycle progresses, thereby decreasing a lifespan of the lithium battery. Also, a coated separator may generate static electricity, depending on the type of the binder used. For example, although a separator coated with polyvinylidene fluoride may have excellent binding strength to electrode plates and high acid resistance, the separator may generate static electricity, thereby generating processing defects (such as a negative electrode insertion defect and a negative electrode tab location defect) during a rolling process of an electrode assembly that has a structure of positive electrode/separator/negative electrode.

The embodiments provide a separator that plays an important role in performance and stability of a lithium battery.

As described above, according to the one or more of the above embodiments, a coated separator according to an embodiment may help disperse electrostatic charges of a separator coated with a binder, e.g., polyvinylidene fluoride, to help ameliorate problems that may otherwise occur due to the generation of electrostatic charges. The coated separator may be applied to various electrochemical devices such as a lithium battery, and a lithium battery including the coated separator may help inhibit the generation of electrostatic charges and may help inhibit a decrease in capacity retention rate that may otherwise occur as a charge and discharge cycle progresses.

The embodiments may provide a coated separator that helps reduce generation of static electricity and that helps inhibit a decrease in capacity retention rate that may otherwise occur as a charge and discharge cycle progresses.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator for a battery, the separator comprising:
a separator substrate; and
a separator coating layer coated on at least one surface of the separator substrate, the separator coating layer including a composite mixture of a binder and at least one quaternary ammonium salt, the composite mixture being formed by dispersing the binder and quaternary ammonium salt in a solvent,
wherein the at least one quaternary ammonium salt is included in the coating layer in an amount of about 0.5 wt % to about 50 wt %, based on a total weight of the binder and the at least one quaternary ammonium salt.

2. The separator as claimed in claim 1, wherein the at least one quaternary ammonium salt is represented by Formula 1, below:

[Formula 1]

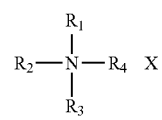

wherein, in Formula 1, R$_1$, R$_2$, R$_3$, and R$_4$ are each independently a C$_1$-C$_5$ alkyl group, and X is a fluorine-containing negative ion.

3. The separator as claimed in claim 2, wherein X is PF$_6^-$, BF$_4^-$, AsF$_6^-$, SbF$_6^-$, N(SO$_2$CF$_3$)$_2^-$, N(SO$_2$F)$_2^-$, N(SO$_2$CF$_3$)(COCF$_3$)$^-$, N(SO$_2$CF$_3$)(SO$_2$C$_2$F$_5$)$^-$, SO$_3$CF$_3^-$, SO$_3$C$_2$F$_5^-$, SO$_3$C$_3$F$_7^-$, or SO$_3$C$_4$F$_9^-$.

4. The separator as claimed in claim 2, wherein the portion of Formula 1 that includes N and R$_1$, R$_2$, R$_3$, and R$_4$ is a positive ion, the positive ion being one of tetramethylammonium, tetraethylammonium, tetrapropylammonium, tetrabutylammonium, tetrapentylammonium, trimethylethylammonium, trimethylbutylammonium, trimethylpropylammonium, triethylmethylammonium, trimethylpropylammonium, triethylbutylammonium, tripropylmethylammonium, tripropylethylammonium, tripropylbutylammonium, tributylmethylammonium, tributylethylammonium, tributylpropylammonium, dimethyldiethylammonium, dimethyldipropylammonium, dimethyldibutylammonium, diethyldipropylammonium, diethyldibutylammonium, dipropyldibutylammonium, dimethylethylpropylammonium, dimethylethylbutylammonium, dimethylpropylbutylammonium, diethylmethylpropylammonium, diethylmethylbutylammonium, diethylpropylbutylammonium, dipropylmethylethylammonium, dipropylmethylbutylammonium, dipropylethylbutylammonium, or methylethylpropylbutylammonium.

5. The separator as claimed in claim 1, wherein the binder includes polyvinylidene fluoride.

6. The separator as claimed in claim 5, wherein the binder includes the polyvinylidene fluoride in an amount of about 50 wt % or greater, based on a total weight of the binder.

7. The separator as claimed in claim 5, wherein the binder further includes polyvinylidene chloride, polybenzimidazole, polyimide, polyvinyl acetate, polyacrylonitrile, polyvinyl alcohol, carboxymethylcellulose (CMC), starch, hydroxypropyl cellulose, regenerated cellulose, polyvinylpyrrolidone, tetrafluoroethylene, polyethylene, polypropylene, polystyrene, polymethylmethacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethylenesulfone, polyamide, polyacetal, polyphenylene oxide, polybutylene terephthalate, ethylene-propylene-diene terpolymer (EPDM), sulfonated EPDM, styrene butadiene rubber, fluoride rubber, or a copolymer thereof.

8. The separator as claimed in claim 1, wherein the separator substrate is a porous film, a non-woven fabric, or a woven fabric.

9. The separator as claimed in claim 1, wherein the separator substrate has a thickness of about 1 μm to about 300 μm.

10. The separator as claimed in claim 1, wherein the separator substrate has:
an average pore diameter of about 0.01 μm to about 50 μm, and
a porosity of about 10% to about 95%.

11. The separator as claimed in claim 1, wherein the separator substrate is a single layer porous substrate formed of at least one of polyethylene, polypropylene, polybutylene, polypentene, polytetrafluoroethylene (PTFE), polyester, polyacetal, polyamide, polycarbonate, polyimide, polyetheretherketone, polyethersulfone, polyphenylene oxide, polyphenylene sulfide, polyethylene naphthalene, or glass fiber.

12. The separator as claimed in claim 1, wherein the separator substrate is a multi-layer film of olefin-based polymers.

13. The separator as claimed in claim 12, wherein each layer of the multi-layer film independently includes polyethylene, polypropylene, or polyvinylidene fluoride.

14. The separator as claimed in claim 1, wherein the separator has a quantity of electrostatic charge of about 0.6 kV or less.

15. The separator as claimed in claim 1, wherein the separator coating layer has a thickness of about 1 μm to about 100 μm.

16. The separator as claimed in claim 5, wherein the quaternary ammonium salt is tetraethylammonium hexafluorophosphate.

17. An electrochemical device comprising the coated separator as claimed in claim 1.

18. The electrochemical device as claimed in claim 17, wherein the electrochemical device is a lithium battery.

19. The electrochemical device as claimed in claim 18, wherein the lithium battery is a lithium secondary battery.

20. A method of fabricating the separator as claimed in claim 1, the method comprising:
preparing a coating dispersion that includes the binder and the at least one quaternary ammonium salt in the solvent, and
coating the coating dispersion on the separator substrate.

* * * * *